(12) United States Patent
Matsushita et al.

(10) Patent No.: US 12,604,095 B2
(45) Date of Patent: *Apr. 14, 2026

(54) SHAKE CORRECTION DEVICE AND IMAGING APPARATUS

(71) Applicant: FUJIFILM Corporation, Tokyo (JP)

(72) Inventors: Shuhei Matsushita, Saitama (JP); Yuta Abe, Saitama (JP); Takuro Abe, Saitama (JP); Yota Akashi, Saitama (JP); Kouhei Awazu, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 16 days.

This patent is subject to a terminal disclaimer.

(21) Appl. No.: 18/586,582

(22) Filed: Feb. 26, 2024

(65) Prior Publication Data

US 2024/0292102 A1 Aug. 29, 2024

(30) Foreign Application Priority Data

Feb. 28, 2023 (JP) ................................. 2023-030140

(51) Int. Cl.
*H04N 23/68* (2023.01)
(52) U.S. Cl.
CPC ................................. *H04N 23/687* (2023.01)
(58) Field of Classification Search
CPC .................................................. H04N 23/687
See application file for complete search history.

(56) References Cited

U.S. PATENT DOCUMENTS

| | | | |
|---|---|---|---|
| 9,995,988 B2 | 6/2018 | Ezawa | |
| 10,980,514 B2 * | 4/2021 | Yoshida | ................. H05K 1/028 |

| | | | | |
|---|---|---|---|---|
| 2010/0277604 A1 | 11/2010 | Sasaki et al. | | |
| 2014/0293073 A1 | 10/2014 | Okamura et al. | | |
| 2020/0329200 A1 | 10/2020 | Tanaka | | |
| 2021/0251082 A1 * | 8/2021 | Ono | ......................... | G03B 5/00 |
| 2022/0006958 A1 | 1/2022 | Awazu et al. | | |
| 2022/0272264 A1 * | 8/2022 | Horio | ..................... | H05K 1/028 |
| 2022/0329712 A1 * | 10/2022 | Wang | ................... | H05K 1/0277 |
| 2024/0292101 A1 * | 8/2024 | Abe | ..................... | H04N 23/687 |

FOREIGN PATENT DOCUMENTS

| | | |
|---|---|---|
| JP | 2010192749 | 9/2010 |
| JP | 2016170339 | 9/2016 |
| JP | 2016173517 | 9/2016 |
| JP | 2020170963 | 10/2020 |

OTHER PUBLICATIONS

"Office Action of U.S. Appl. No. 18/586,581", issued on Nov. 3, 2025, pp. 1-24.

* cited by examiner

*Primary Examiner* — Christopher K Peterson
(74) *Attorney, Agent, or Firm* — JCIPRNET

(57) ABSTRACT

Provided are a shake correction device and an imaging apparatus that can be thinned.

A shake correction device performs shake correction of an imaging element and includes a movable unit that includes the imaging element and a coil of an actuator and is configured to move within a plane intersecting an optical axis; a fixed unit including a magnet and a yoke of the actuator; and a flexible circuit that is connected to the imaging element and/or the coil, in which the flexible circuit has a first bent portion and a second bent portion that are bent, and is disposed to form a first unit by making opening portions of the first bent portion and the second bent portion face each other and fixing the first bent portion and the second bent portion in regions overlapping with each other.

14 Claims, 16 Drawing Sheets

FPC2

FPC1

141

143

115a

S3

FPC2

FPC1

149

147

FPC

113

113

FPC

113

FPC

113

113

FPC

113

500

501

501

+Y
+X
+Z
−Z
−X
−Y

SHAKE CORRECTION DEVICE AND IMAGING APPARATUS

CROSS-REFERENCE TO RELATED APPLICATION

The present application claims priority under 35 U.S.C § 119(a) to Japanese Patent Application No. 2023-030140 filed on Feb. 28, 2023, which is hereby expressly incorporated by reference, in its entirety, into the present application.

BACKGROUND OF THE INVENTION

1. Field of the Invention

The present invention relates to a shake correction device and an imaging apparatus.

2. Description of the Related Art

In the related art, there has been proposed a technology of a camera in which a shake correction device for suppressing a shake caused by a camera shake or the like is attached to an imaging element (image sensor).

For example, JP2010-192749A discloses a shake correction device including a slider (movable unit) that holds an imaging element, a fixed unit that holds the slider such that the slider can be displaced in a two-dimensional direction orthogonal to an optical axis, and a flexible printed circuit that is connected to a device such as the imaging element.

SUMMARY OF THE INVENTION

An embodiment according to a technology of the present disclosure provides a shake correction device and an imaging apparatus that can be thinned.

A shake correction device according to a first aspect of the present invention performs shake correction of an imaging element and comprises: a movable unit that includes the imaging element and a coil of an actuator and is configured to move within a plane intersecting an optical axis; a fixed unit including a magnet and a yoke of the actuator; and a flexible circuit that is connected to the imaging element and/or the coil, in which the flexible circuit has a first bent portion and a second bent portion that are bent, and is disposed to form a first unit by making opening portions of the first bent portion and the second bent portion face each other and fixing the first bent portion and the second bent portion in regions overlapping with each other.

According to a second aspect of the present invention, in the shake correction device according to the first aspect, preferably, the first unit has two overlapping regions, the opening portion of the first bent portion is located outside in one overlapping region, and the opening portion of the second bent portion is located outside in the other overlapping region.

According to a third aspect of the present invention, in the shake correction device according to the first aspect, preferably, the first bent portion and the second bent portion overlap with each other by a length equal to or larger than a width of the first bent portion or a width of the second bent portion in the overlapping region.

According to a fourth aspect of the present invention, in the shake correction device according to the first aspect, preferably, the first bent portion and the second bent portion are fixed with a gap in the overlapping region.

According to a fifth aspect of the present invention, in the shake correction device according to the first aspect, preferably, the first bent portion and the second bent portion are fixed by disposing a metal member between the first bent portion and the second bent portion in the overlapping region.

According to a sixth aspect of the present invention, in the shake correction device according to the first aspect, preferably, the first bent portion and the second bent portion are fixed by disposing a resin member between the first bent portion and the second bent portion in the overlapping region.

According to a seventh aspect of the present invention, in the shake correction device according to the first aspect, preferably, the first bent portion and the second bent portion are fixed by disposing an electromagnetic noise suppression member between the first bent portion and the second bent portion in the overlapping region.

According to an eighth aspect of the present invention, in the shake correction device according to the first aspect, preferably, the first bent portion and the second bent portion are disposed such that a noise source line of the first bent portion and a noise-receiving line having high noise sensitivity of the second bent portion are separated from each other in the overlapping region.

According to a ninth aspect of the present invention, in the shake correction device according to the first aspect, preferably, the first bent portion and the second bent portion are disposed such that a digital power supply line of the first bent portion and an analog power supply line of the second bent portion are separated from each other in the overlapping region.

According to a tenth aspect of the present invention, in the shake correction device according to the first aspect, preferably, the first bent portion and the second bent portion are disposed such that a metal wire of the first bent portion and an impedance matching signal line for high-speed communication of the second bent portion are separated from each other in the overlapping region.

According to an eleventh aspect of the present invention, in the shake correction device according to the first aspect, preferably, the first unit is disposed on a surface of the movable unit intersecting an imaging surface of the imaging element.

According to a twelfth aspect of the present invention, in the shake correction device according to the first aspect, preferably, the flexible circuit has a third bent portion and a fourth bent portion that are bent, and is disposed to form a second unit by making opening portions of the third bent portion and the fourth bent portion face each other and fixing the third bent portion and the fourth bent portion in regions overlapping with each other.

According to a thirteenth aspect of the present invention, in the shake correction device according to the twelfth aspect, preferably, the first unit and the second unit are disposed on a surface of the movable unit intersecting an imaging surface of the imaging element, and are disposed at positions where rotational moments cancel each other out with respect to a centroid of the movable unit.

An imaging apparatus according to a fourteenth aspect of the present invention preferably comprises the shake correction device according to any one of the first to thirteenth aspects.

BRIEF DESCRIPTION OF THE DRAWINGS

FIG. 11 is a view for explaining Embodiment 3 of the overlapping region.

FIG. 12 is a view for explaining Embodiment 4 of the overlapping region.

DESCRIPTION OF THE PREFERRED EMBODIMENTS

First, circumstances leading to the present invention will be described.

In the related art, a camera having optical image stabilization (OIS) in which a lens device portion of the camera has an image stabilization function has been the mainstream. However, in recent years, as performance of the camera has improved, or for the purpose of reducing a size of the camera, an increasing number of cameras are equipped with an in-body image stabilization (BIS) in which an imaging element is driven to perform correction. In addition, as the imaging element has become larger, a BIS device is made smaller by devising disposition of an actuator for driving the imaging element and the routing of a flexible printed circuit (FPC) for connecting a signal line from the imaging element to a main board.

Figure 20:
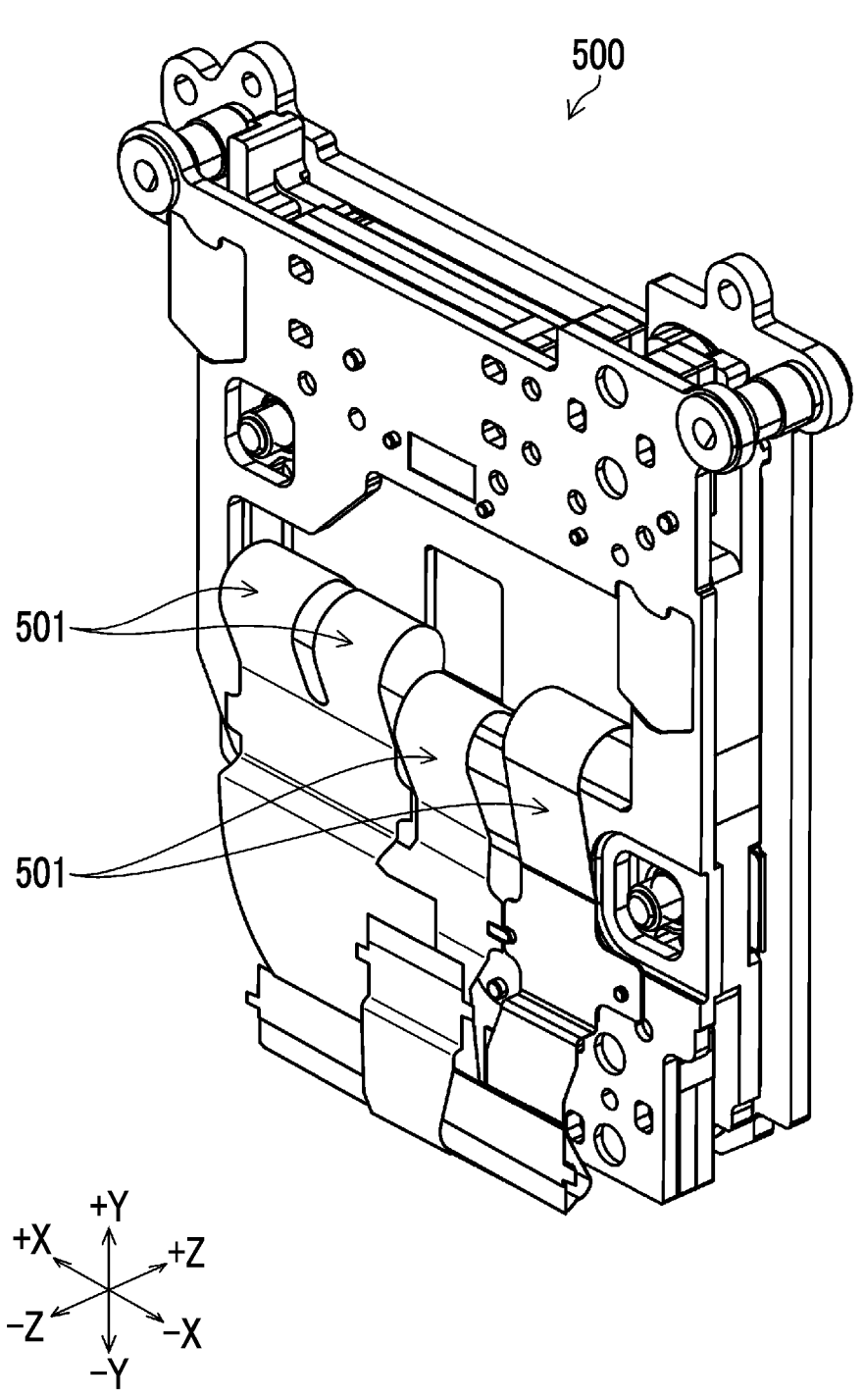
FIG. 20 is a rear perspective view showing a shake correction device in the related art.

FIG. 20 is a rear perspective view showing a shake correction device in the related art.

As shown in the drawing, in a shake correction device 500 of a BIS in the related art, a flexible printed circuit (FPC) 501 is routed on a back surface in an optical axis direction (here, it means an optical axis of an optical system of a camera equipped with the shake correction device 500 and is shown in a Z-axis direction in the drawing). As described above, in a case where the FPC 501 is routed on the back surface of the shake correction device 500 in the optical axis direction, a thickness of the shake correction device 500 in the optical axis direction is increased. This is because it is necessary to make a bending radius R of the FPC 501 equal to or larger than a certain value to reduce the reaction force in order to prevent a reaction force of the FPC 501 from becoming large during driving of the shake correction device 500 and the need for a large actuator. Further, in a case where the thickness of the shake correction device 500 increases in the optical axis direction in this way, there may be an obstacle to thinning of the camera equipped with the shake correction device 500.

According to the present invention described below, it is possible to reduce the thickness of the shake correction device in the optical axis direction and to reduce a thickness of the imaging apparatus equipped with the shake correction device.

Preferred embodiments of a shake correction device and an imaging apparatus according to the present invention will be described with reference to the accompanying drawings.
Imaging Apparatus An imaging apparatus equipped with a shake correction device (BIS) that suppresses an image shake in an image to be obtained, due to a shake such as a camera shake, will be described.

Figure 1:
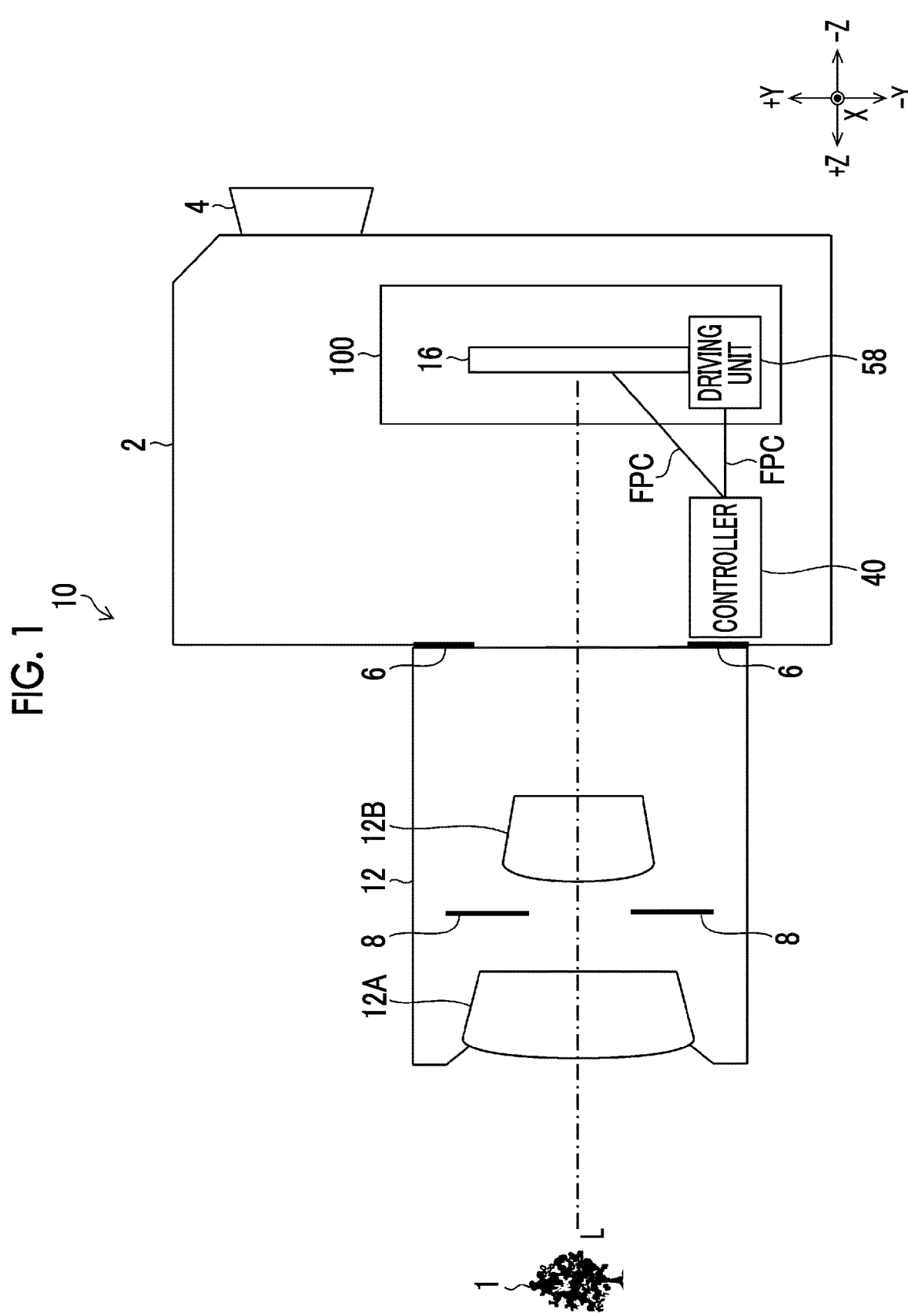
FIG. 1 is a schematic view of an inside of an imaging apparatus that is equipped with a shake correction device of the embodiment of the present invention.

FIG. 1 is a schematic view of an inside of an imaging apparatus 10 that is equipped with a shake correction device 100 of the embodiment of the present invention.

The imaging apparatus 10 is a lens-interchangeable camera, and an imaging lens device 12 is mounted on the imaging apparatus main body 2 via an adapter 6. The imaging lens device 12 comprises a stop 8 and lens groups 12A and 12B. The imaging lens device 12 having an optical axis L forms an image of light reflected by a subject 1. The imaging apparatus main body 2 comprises an eyepiece portion 4, and an imager places his/her eye on the eyepiece portion 4 to image the subject 1 in a case of imaging the subject 1.

On an imaging element 16, a light-receiving surface (imaging surface) is disposed along a plane (X-Y plane) formed by two directions (X direction and Y direction) perpendicular to the optical axis L of the imaging apparatus main body 2. The imaging element 16 is held in the shake correction device 100. Further, a shake correction function is realized by a controller 40 controlling a driving unit 58 included in the shake correction device 100. The controller 40 is connected to the imaging element 16 and the driving unit 58 by the FPC and transmits and receives electrical signals.

Figure 2:
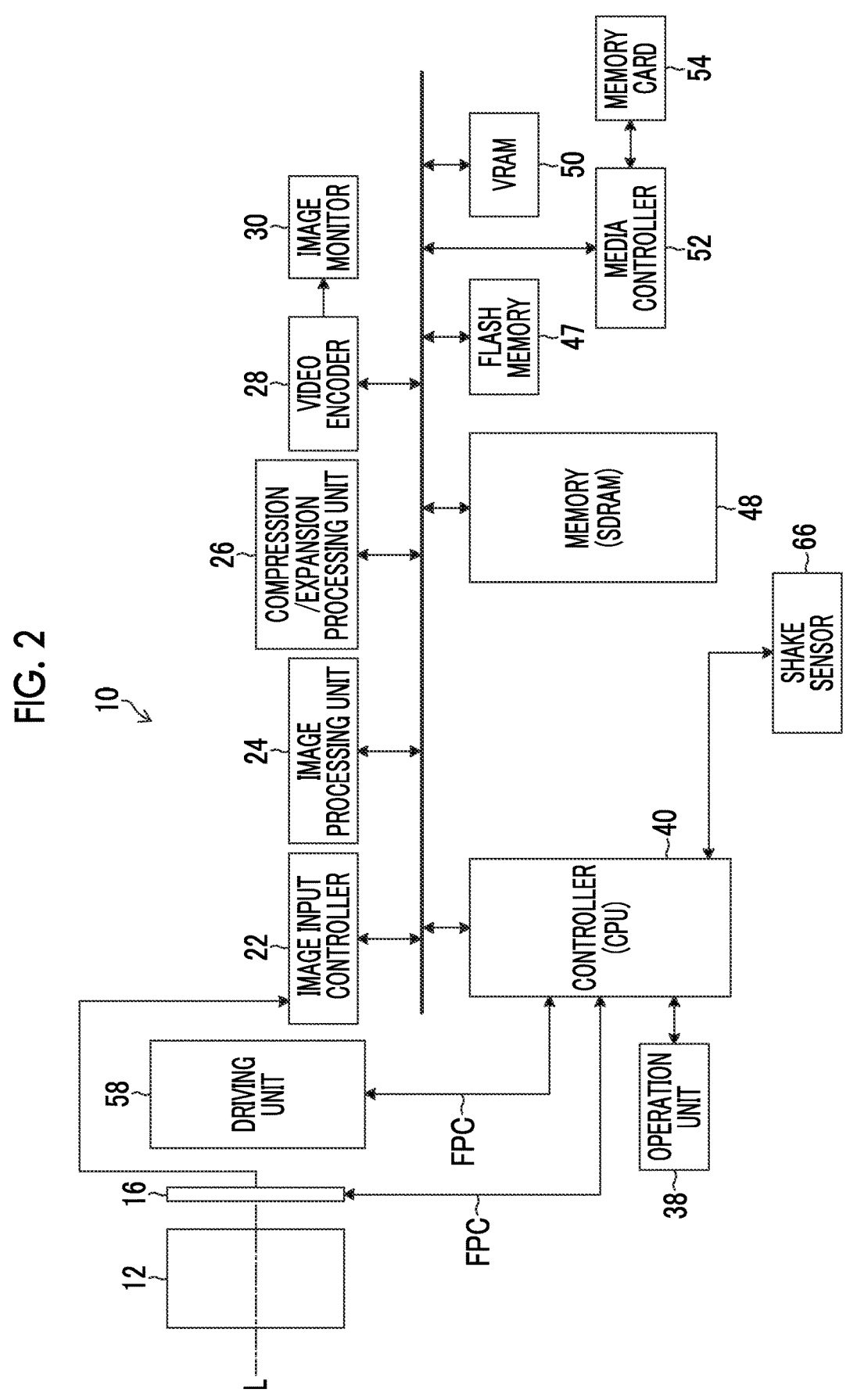
FIG. 2 is a block diagram showing an embodiment of an internal configuration of the imaging apparatus.

FIG. 2 is a block diagram showing an embodiment of an internal configuration of the imaging apparatus 10. The imaging apparatus 10 records a captured image in a memory card 54, and an operation of the entire apparatus is comprehensively controlled by the controller (central processing unit (CPU)) 40.

The imaging apparatus 10 is provided with an operation unit 38, such as a shutter button, a power/mode switch, a mode dial, and a cross operation button. A signal (command) from the operation unit 38 is input to the controller 40, and the controller 40 controls each circuit of the imaging apparatus 10 based on the input signal to perform drive control of the imaging element 16, lens drive control, stop drive control, imaging operation control, image processing control, recording/reproduction control of image data, display control of an image monitor 30, and the like.

A luminous flux that has passed through the imaging lens device 12 is imaged on the imaging element 16 which is a complementary metal-oxide semiconductor (CMOS) type color image sensor. The imaging element 16 is not limited to the CMOS type, and another type of image sensor, such as a charge coupled device (CCD) type or an organic imaging element, may be used.

In the imaging element 16, a large number of light-receiving elements (photodiodes) are two-dimensionally arranged, and a subject image formed on the light-receiving surface of each light-receiving element is converted (photoelectrically converted) into a signal voltage (or charge) of an amount corresponding to an amount of incidence ray, and is converted into a digital signal via an analog/digital (A/D) converter in the imaging element 16 to be output.

An image signal (image data) read from the imaging element 16 in a case of capturing a motion picture or a still picture is temporarily stored in a memory (synchronous dynamic random access memory (SDRAM)) 48 via an image input controller 22.

Further, a flash memory 47 stores various parameters and tables used for a camera control program, image processing, and the like.

A shake sensor 66 detects posture information and posture change information of the imaging apparatus 10. The shake sensor 66 is configured of, for example, a gyro sensor. The shake sensor 66 is configured of, for example, two gyro sensors to detect a camera shake amount in a vertical direction and a camera shake amount in a horizontal direction, and the detected camera shake amount (angular velocity) is input to the controller 40. Further, the shake sensor 66 includes a hall sensor described below. The controller 40 acquires a movement amount of the movable unit 101 by the hall sensor, and controls the driving unit 58 according to the movement amount. That is, the controller 40 controls the driving unit 58 to move the imaging element 16 such that the movement of the subject image caused by a camera shake is canceled. Thus, the shake correction is performed in the shake correction device 100.

The driving unit 58 is configured of an actuator that moves the movable unit 101 by an electric signal (drive signal) from the controller 40. Specific examples of the actuator include voice coil motors 103*a* to 103*c* (see FIG. 3). The driving unit 58 moves the movable unit 101 on the X-Y plane perpendicular to the optical axis L in response to the electric signal input from the controller 40.

An image processing unit 24 reads unprocessed image data that is acquired via the image input controller 22 in case of capturing a motion picture or a still picture and temporarily stored in the memory 48. The image processing unit 24 performs offset processing, pixel interpolation processing (interpolation processing for a phase difference detecting pixel, a defective pixel, and the like), white balance correction, gain control processing including sensitivity correction, gamma-correction processing, synchronization processing (also called "demosaicing"), brightness and color difference signal generation processing, edge enhancement processing, color correction, and the like on the read image data. The image data that is processed by the image processing unit 24 and is processed as a live view image is input to a video random access memory (VRAM) 50.

The image data read from the VRAM 50 is encoded by a video encoder 28 and output to the image monitor 30 provided on a rear surface of the camera. Accordingly, the live view image showing the subject image is displayed on the image monitor 30.

The image data that is processed by the image processing unit 24 and is processed as a still picture or motion picture for recording (brightness data (Y) and color difference data (Cb), (Cr)) is stored again in the memory 48.

A compression/expansion processing unit 26 performs compression processing on the brightness data (Y) and the color difference data (Cb), (Cr) processed by the image processing unit 24 and stored in the memory 48 in a case of recording a still picture or a motion picture. The compressed image data is recorded in the memory card 54 via a media controller 52.

Further, the compression/expansion processing unit 26 performs expansion processing on the compressed image data obtained from the memory card 54 via the media controller 52 in a playback mode. The media controller 52 records and reads the compressed image data to and from the memory card 54.

In the above embodiment, a hardware structure of a processing unit (controller 40 or the like) that executes various kinds of processing includes various processors to be described below. The various processors include a central processing unit (CPU) that is a general-purpose processor functioning as various processing units by executing software (program), a programmable logic device (PLD) such as a field programmable gate array (FPGA) that is a processor having a circuit configuration changeable after manufacture, a dedicated electric circuit such as an application specific integrated circuit (ASIC) that is a processor having a circuit configuration dedicatedly designed to execute specific processing, and the like.

One processing unit may be configured of one of the various processors or may be configured of two or more processors of the same type or different types (for example, a plurality of FPGAs or a combination of a CPU and an FPGA). In addition, a plurality of processing units may be configured of one processor. As an example of configuring the plurality of processing units by one processor, first, there is a form in which one processor is configured of a combination of one or more CPUs and software, as typified by a computer such as a client or a server, and the one processor functions as the plurality of processing units. Second, there is a form in which a processor that realizes functions of an entire system including a plurality of processing units with one integrated circuit (IC) chip is used, as typified by a system on chip (SoC) or the like. As described above, the various processing units are configured using one or more of the above various processors as a hardware structure.

Further, as the hardware structure of the various processors, more specifically, an electric circuit (circuitry) in which circuit elements such as semiconductor elements are combined may be used.

Shake Correction Device

Next, the shake correction device 100 will be described.

Figure 3:
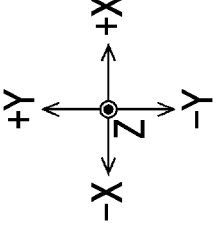
FIG. 3 is a front view of the shake correction device.

FIG. 3 is a front view of the shake correction device 100 (a view from a subject side in the optical axis direction) and is a view for explaining a main layout of the shake correction device 100.

The shake correction device 100 is mainly composed of the movable unit 101 and a fixed unit 111.

The movable unit 101 holds the imaging element 16 and coils (not shown) constituting the voice coil motors 103*a* to 103*c*. The movable unit 101 is movably held within a plane (in FIG. 3, X-Y plane) intersecting the optical axis (in FIG. 3, represented by a Z axis). The movable unit 101 is moved by the voice coil motors 103*a* to 103*c* in a direction of canceling an amount moved due to a camera shake or the like. Thus, it is possible to cause the imaging element 16 to acquire an image in which the image shake is suppressed in the shake correction device 100. The voice coil motors 103*a* to 103*c* comprise hall sensors (not shown) that detect a position of the movable unit 101. The hall sensors detect the position of the movable unit 101 and transmit information related to the position of the movable unit 101 to the controller 40. The hall sensors constitute a part of the shake sensor 66.

The fixed unit 111 is mainly composed of magnets 109a to 109c constituting the voice coil motors 103a to 103c, a base plate 119, and a counter plate (not shown). The base plate 119 and the counter plate function as yokes. The counter plate is provided to be spaced apart from the base plate 119 in the optical axis direction (Z-axis direction) so as to face the base plate 119. In addition, the movable unit 101 is biased by an attractive force of a magnet (not shown) or an elastic force of a spring (not shown) with respect to the base plate 119. In addition, a plurality of balls (not shown) are interposed between the movable unit 101 and the base plate 119, and the movable unit 101 can move on the X-Y plane by the rolling of the balls.

The shake correction device 100 includes the FPCs connected to the imaging element 16 and/or the voice coil motors 103a to 103C. Specifically, the shake correction device 100 includes an FPC for driving the imaging element 16, an FPC for communicating data between the imaging element 16 and a main board, and an FPC for driving the voice coil motors 103a to 103C. These FPCs electrically connect the controller 40 of the imaging apparatus main body 2 to the imaging element 16 and the coils held by the movable unit 101.

The FPCs are disposed to form an elliptical FPC unit 105a (first unit) and an elliptical FPC unit 105b (second unit) that are routed in an elliptical shape having two bent portions. In a case where the elliptical FPC units 105a and 105b are disposed on a vertical (Y-axis direction) or horizontal (X-axis direction) side surface 101a of the movable unit 101 holding the imaging element 16, the elliptical FPC units 105a and 105b can contribute to thinning of the shake correction device 100. That is, in the shake correction device 100, a routing area of the FPC is changed from a thickness direction (Z-axis direction) in the related art (see FIG. 20) to a width direction (X-axis direction) or a height direction (Y-axis direction), so that the shake correction device 100 can be made thinner in the thickness direction. Further, it is preferable that the elliptical FPC units 105a and 105b are disposed at positions on a side opposite to the voice coil motors 103a and 103b with the imaging element 16 interposed therebetween. Thereby, it is possible to perform the layout of both sides of the imaging element 16 in the shake correction device 100 with a good balance.

Figure 4:
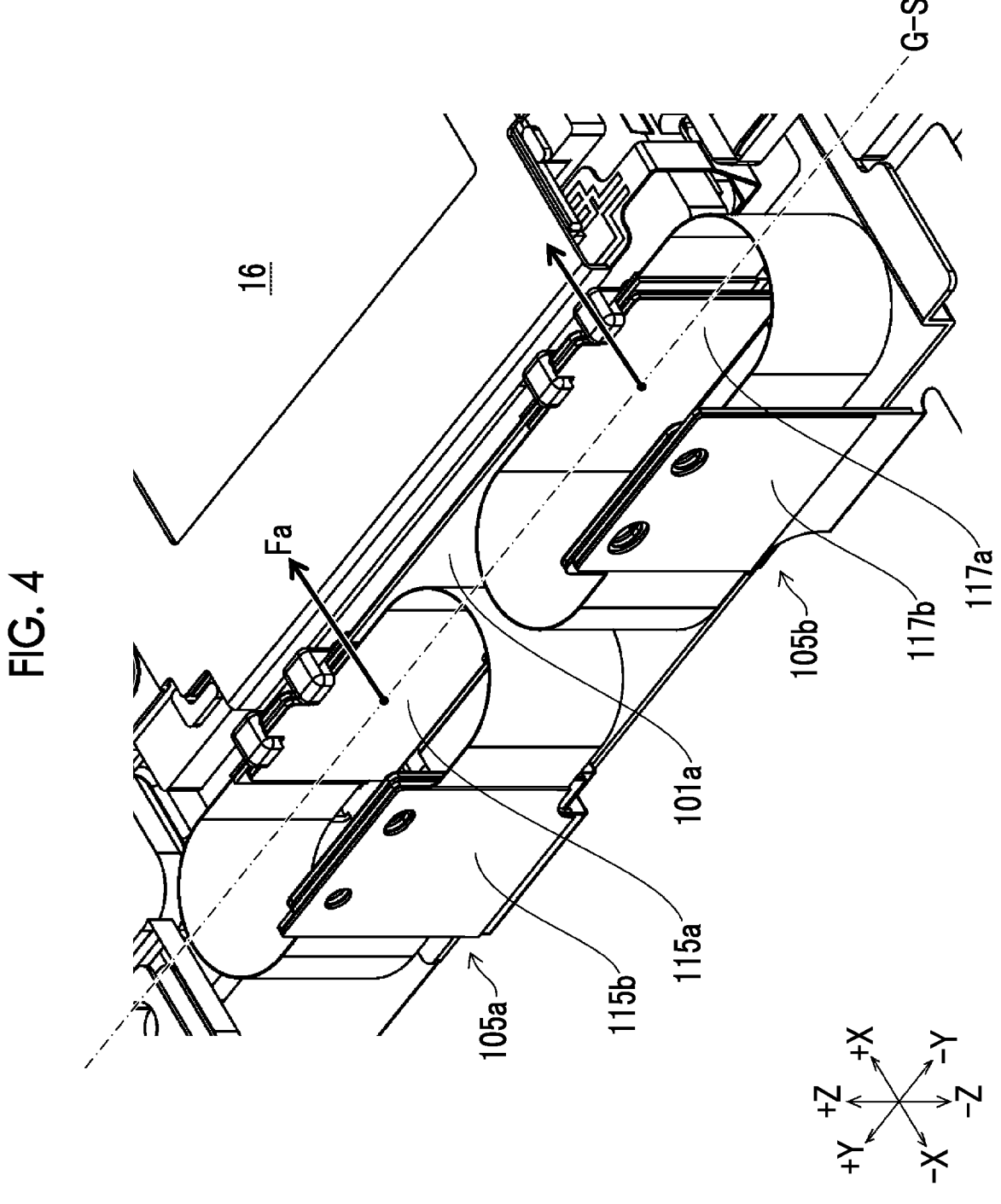
FIG. 4 is an enlarged view showing an elliptical FPC unit shown in FIG. 3.

FIG. 4 is an enlarged view of the elliptical FPC units 105a and 105b shown in FIG. 3.

FIG. 4 shows a reaction force Fa of the elliptical FPC unit 105a to the side surface 101a and a reaction force Fb of the elliptical FPC unit 105b to the side surface 101a. In addition, in FIG. 4, a plane G-S in the X-Y plane including the centroid G of the movable unit 101 is indicated by a dotted line.

The elliptical FPC units 105a and 105b are connected to the side surface 101a of the movable unit 101 holding the imaging element 16, as shown in the drawing. Here, the side surface 101a of the movable unit 101 is a surface (Y-Z plane) that perpendicularly intersects the imaging surface (X-Y plane) of the imaging element 16. Further, the elliptical FPC unit 105a is fixed in regions (overlapping regions 115a, 115b, 117a, and 117b) where the bent portions overlap with each other.

Since the elliptical FPC units 105a and 105b have the same shape, the reaction force Fa and the reaction force Fb are equal to each other. In this way, a difference between the reaction force Fa and the reaction force Fb is reduced, so that a load on the movable unit 101 is stabilized. In addition, it is desirable to design widths of the elliptical FPC units 105a and 105b in the optical axis direction to coincide with a width of the movable unit 101. This is because reaction force acting points of the elliptical FPC units 105a and 105b (indicated by starting points of arrows indicating the reaction forces Fa and Fb in the drawing) act near the plane (G-S) including the centroid G of the movable unit 101 in the optical axis direction, so that driving is stabilized. It should be noted that design requirements described above contribute to simplifying a control design of the shake correction device 100.

Figure 5:
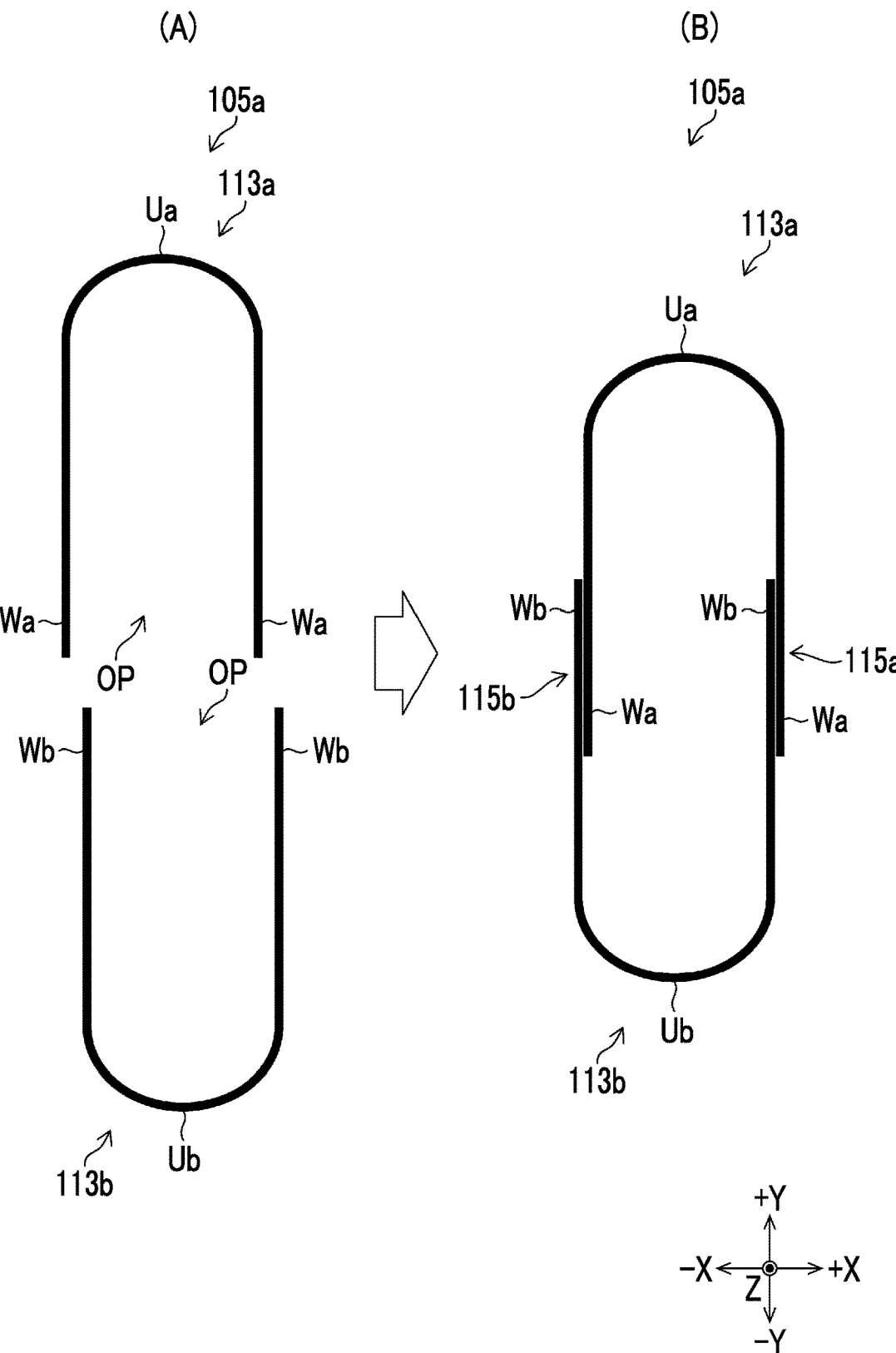
FIG. 5 is a schematic view showing the elliptical FPC unit.

FIG. 5 is a schematic view showing the elliptical FPC unit 105a. FIG. 5 is a view of the elliptical FPC unit 105a as viewed from the subject side in the optical axis direction. Since the elliptical FPC unit 105b has the same configuration as the elliptical FPC unit 105a, the description thereof will not be repeated here. In addition, the elliptical FPC unit 105b is configured of a third bent portion and a fourth bent portion in the same way that the elliptical FPC unit 105a is configured of a first bent portion and a second bent portion.

(A) of FIG. 5 is an exploded view for explaining the elliptical FPC unit 105a, and (B) of FIG. 5 is a schematic view of the elliptical FPC unit 105a.

As shown in (A) of FIG. 5, the elliptical FPC unit 105a is composed of a first bent portion 113a and a second bent portion 113b. The first bent portion 113a is composed of a curved portion Ua, an opening portion OP, and an opening portion side surface Wa extending from the curved portion Ua. Further, the second bent portion 113b is composed of a curved portion Ub, an opening portion OP, and an opening portion side surface Wb. Further, the elliptical FPC unit 105a has the overlapping region 115a and the overlapping region 115b that are regions where the first bent portion 113a and the second bent portion 113b overlap with each other.

As shown in (B) of FIG. 5, the elliptical FPC unit 105a is configured such that the opening portion OP of the first bent portion 113a and the opening portion OP of the second bent portion 113b face each other, and the opening portion side surface Wa of the first bent portion 113a and the opening portion side surface Wb of the second bent portion 113b are overlapped to form the overlapping regions 115a and 115b. As described above, the elliptical FPC unit 105a forms an elliptical shape by routing the FPCs in a U-shape facing each other. Further, by forming the elliptical shape having the first bent portion 113a and the second bent portion 113b, it is possible to reduce an influence of the reaction force due to the bending of the FPC. In the overlapping region 115a, the opening portion side surface Wa is disposed outside, and the opening portion side surface Wb is disposed inside. In the overlapping region 115b, the opening portion side surface Wb is disposed outside, and the opening portion side surface Wa is disposed inside. That is, in the overlapping region 115a, the opening portion OP of the first bent portion 113a is located outside, and in the overlapping region 115b, the opening portion OP of the second bent portion 113b is located outside. By forming the overlapping regions 115a and 115b in this way, the bending radii R of the first bent portion 113a and the second bent portion 113b become equal, and the load on the movable unit 101 is stabilized. In this way, the control design of the shake correction device 100 can be simplified by stabilizing the load on the movable unit 101. It is preferable that the overlapping region 115a and the overlapping region 115b overlap with each other by a length equal to or larger than a width of the first bent portion 113a or the second bent portion 113b.

Next, a rotational moment acting on the movable unit 101 by the elliptical FPC units 105*a* and 105*b* will be described.

Figure 6:
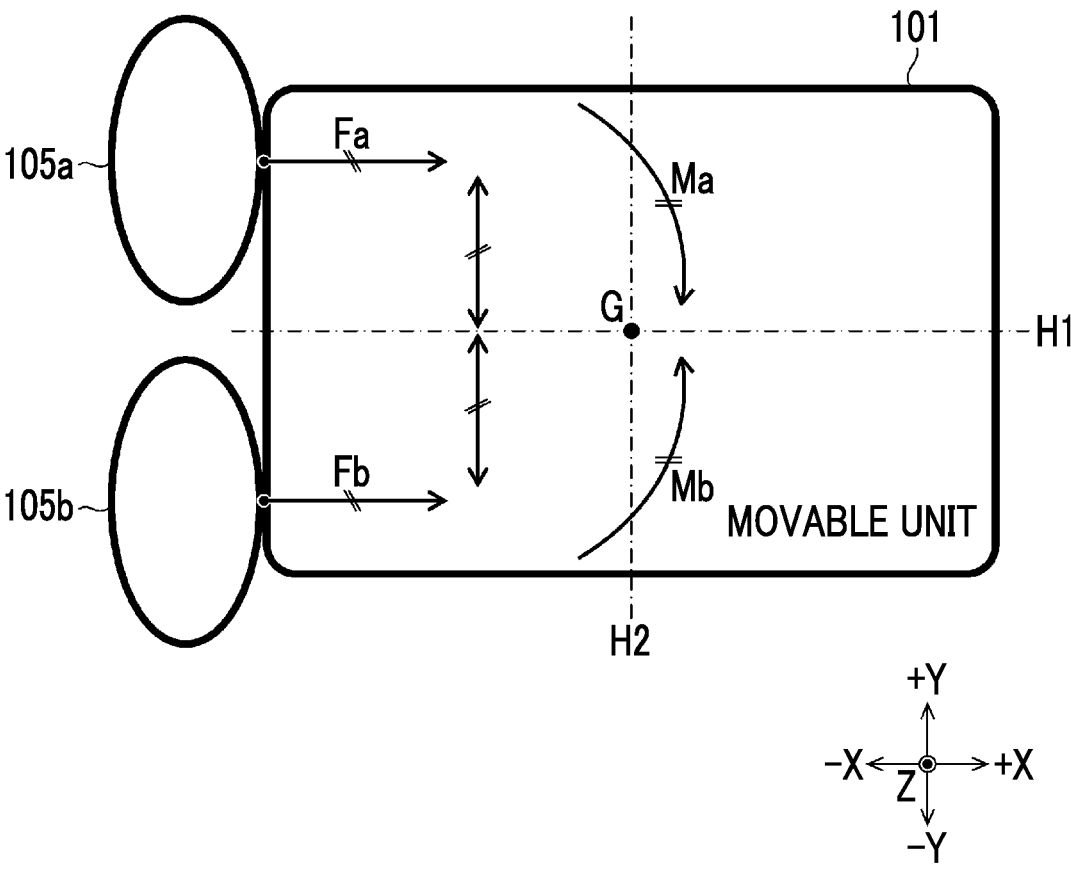
FIG. 6 is a view for explaining a balance of a rotational moment at a centroid G of a movable unit.

FIG. 6 is a view for explaining a balance of a rotational moment at the centroid G of the movable unit 101. The elliptical FPC units 105*a* and 105*b* have the same shape and have equal reaction forces Fa and Fb.

In a case where the elliptical FPC units 105*a* and 105*b* are disposed, it is desirable that they are symmetrically disposed with respect to an axis H1 passing through the centroid G of the movable unit 101, because there is no difference in load by the elliptical FPC units 105*a* and 105*b* and the driving of the movable unit 101 is stabilized. On the other hand, in a case where the elliptical FPC units 105*a* and 105*b* cannot be disposed symmetrically with respect to the axis H1, it is desirable to optimize the disposition of the elliptical FPC units 105*a* and 105*b* so as to cancel a rotational component in consideration of the balance of the rotational moment around the centroid G.

In a case shown in FIG. 6, the elliptical FPC units 105*a* and 105*b* are disposed on the side surface 101*a* of the movable unit 101 on a negative X side. In addition, the elliptical FPC units 105*a* and 105*b* are disposed at positions symmetrical with respect to the axis H1. In a case where the elliptical FPC unit 105*a* and the elliptical FPC unit 105*b* are disposed in this way, a rotational moment Ma acting on the movable unit 101 by the elliptical FPC unit 105*a* and a rotational moment Mb acting on the movable unit 101 by the elliptical FPC unit 105*b* are canceled out.

Here, a rotational moment M at the centroid G of the movable unit 101 can be calculated using the following expression.

Rotational moment *M* acting on movable
unit=Reaction force *F* of elliptical FPC unit×
Distance *N* between centroid *G* and reaction
force acting point                                    Equation In the example shown in the drawing, the reaction force Fa of the elliptical FPC unit 105*a* and the reaction force Fb of the elliptical FPC unit 105*b* are equal to each other. Further, a distance between the acting point of the reaction force Fa of the elliptical FPC unit 105*a* and the centroid G is equal to a distance between the acting point of the reaction force Fb of the elliptical FPC unit 105*b* and the centroid G. Accordingly, the rotational moment Ma and the rotational moment Mb cancel each other out, and the movable unit 101 can be balanced in a state in which the influence of the rotational component is small.

Figure 7:
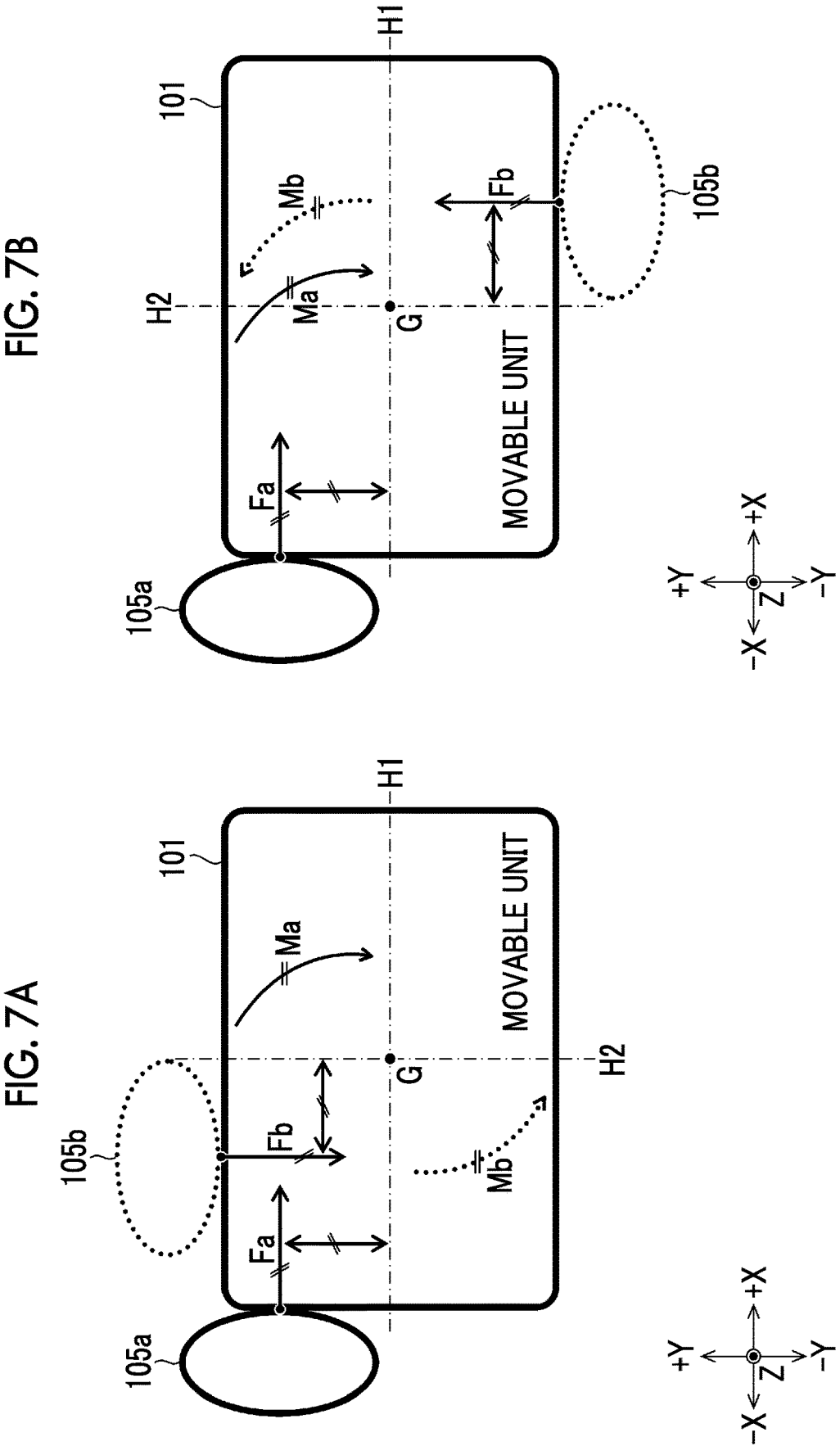
FIGS. 7A and 7B are views for explaining modification examples of disposition of the elliptical FPC unit.

FIGS. 7A and 7B are views for explaining modification examples of the disposition of the elliptical FPC units 105*a* and 105*b*.

FIG. 7A shows Modification Example 1 of the disposition of the elliptical FPC units 105*a* and 105*b*.

In an example shown in FIG. 7A, the elliptical FPC unit 105*a* is disposed on the side surface 101*a* of the movable unit 101 on the negative X side and a positive side in the Y-axis direction. Further, the elliptical FPC unit 105*b* is disposed on the side surface 101*a* of the movable unit 101 on a positive Y side and a negative side in the X-axis direction. In addition, the elliptical FPC units 105*a* and 105*b* are disposed such that a distance between the reaction force Fa of the elliptical FPC unit 105*a* and the axis H1 and a distance between the reaction force Fb of the elliptical FPC unit 105*b* and an axis H2 are equal to each other. By disposing the elliptical FPC units 105*a* and 105*b* in this way, the rotational moment Ma and the rotational moment Mb cancel each other out, and the movable unit 101 can be balanced in a state in which the influence of the rotational component is small.

In an example shown in FIG. 7B, the elliptical FPC unit 105*a* is disposed on the side surface 101*a* of the movable unit 101 on the negative X side and the positive side in the Y-axis direction. Further, the elliptical FPC unit 105*b* is disposed on the side surface 101*a* of the movable unit 101 on a negative Y side and a positive side in the X-axis direction. In addition, the elliptical FPC units 105*a* and 105*b* are disposed such that a distance between the reaction force Fa of the elliptical FPC unit 105*a* and the axis H1 and a distance between the reaction force Fb of the elliptical FPC unit 105*b* and the axis H2 are equal to each other. By disposing the elliptical FPC units 105*a* and 105*b* as described above, the rotational moment Ma and the rotational moment Mb cancel each other out, and the movable unit 101 can be balanced in a state in which the influence of the rotational component is small.

In the example described above, an example in which the elliptical FPC units 105*a* and 105*b* have the same shape is described. The same concept can be applied to a case where the elliptical FPC unit 105*a* and the elliptical FPC unit 105*b* have different shapes. That is, by adjusting a difference between the reaction forces of the elliptical FPC units 105*a* and 105*b* with a difference in the distance from the centroid G, the rotational moments can be canceled out and the load on the movable unit 101 can be balanced. As described above, since there is no offset of the rotational component in the movable unit 101, it is not necessary to perform drive control to always return the offset in the rotation direction, so that control can be simplified, and power consumption can be reduced.

Next, modification examples of the elliptical FPC units 105*a* and 105*b* will be described.

Figure 8:
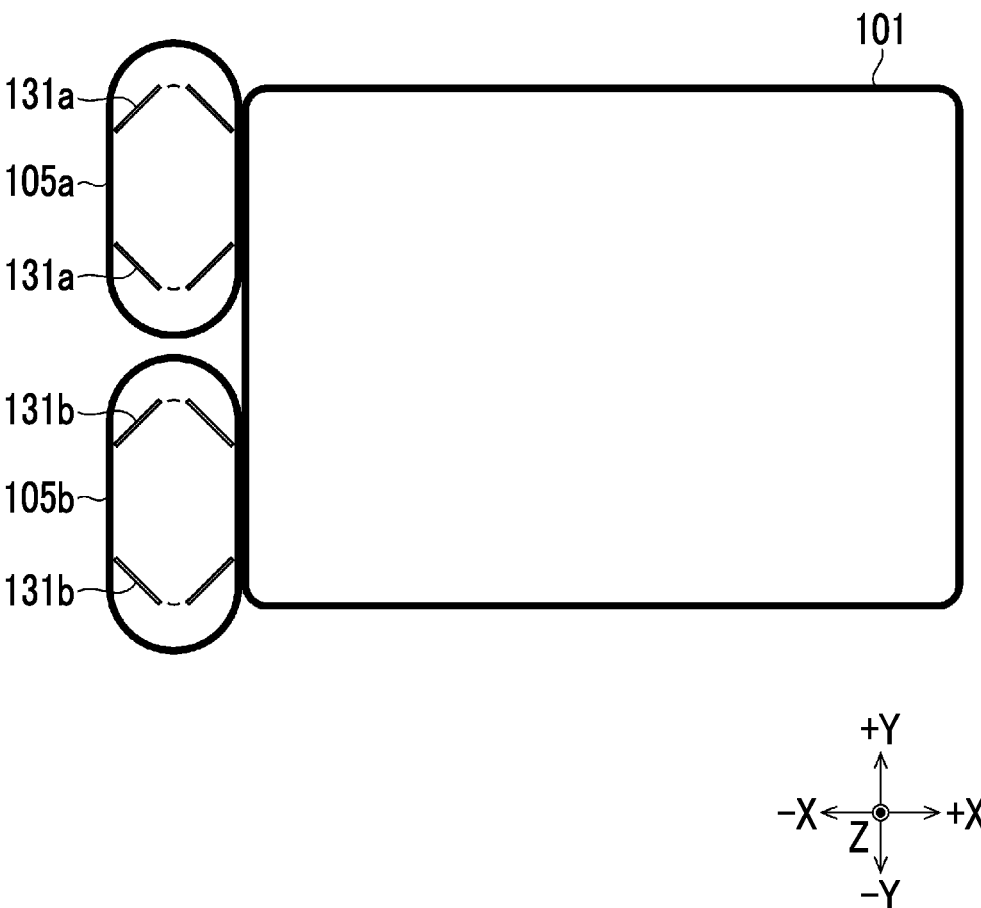
FIG. 8 is a view for explaining a modification example of the elliptical FPC unit.

FIG. 8 is a view for explaining a modification example of the elliptical FPC units 105*a* and 105*b*.

The elliptical FPC unit 105*a* and the elliptical FPC unit 105*b* of the present example include heat radiation members 131*a* and 131*b* inside the elliptical shape. Specifically, the heat radiation members 131*a* and 131*b* are disposed by using an internal region of the elliptical shape of the elliptical FPC unit 105*a* and the elliptical FPC unit 105*b*. Here, the heat radiation members 131*a* and 131*b* are composed of, for example, a pantograph-type graphite sheet. As described above, by attaching the heat radiation member 131*a* to the elliptical FPC unit 105*a* and attaching the heat radiation member 131*b* to the elliptical FPC unit 105*b*, the heat of the movable unit 101 using the imaging element 16 or the like as a heat source can be transferred to the fixed unit 111 and dissipated.

Overlapping Region

Next, the overlapping regions (see FIGS. 7A and 7B) of the elliptical FPC units 105*a* and 105*b* will be described. In the following description, although the overlapping region 115*a* of the elliptical FPC unit 105*a* will be described, the same description will be applied to other overlapping regions (for example, the overlapping region 115*b*) and the description thereof will not be repeated.

First, a reduction of a noise in the overlapping region 115*a* will be described.

In a case where the FPCs overlap with each other, patterns such as drive signals of the imaging element 16 or drive signals of the voice coil motors 103*a* to 103*c* overlap with each other closely. Therefore, in a case where the FPCs are overlapped with each other, an electromagnetic noise (crosstalk) is likely to occur. For example, in a case where a noise is added to the signal of the imaging element 16, a stripe pattern (beat noise) will appear in the image. Further, for example, in a case where a noise is added to the signals of the voice coil motors 103a to 103c, performance deterioration, oscillation, deterioration of a drive sound, and the like of the shake correction device 100 occur. Therefore, it is necessary to perform overlapping of the FPC while reducing the noise in the overlapping region. Hereinafter, an embodiment of the overlapping region in which the noise can be reduced will be described.

Figure 9:
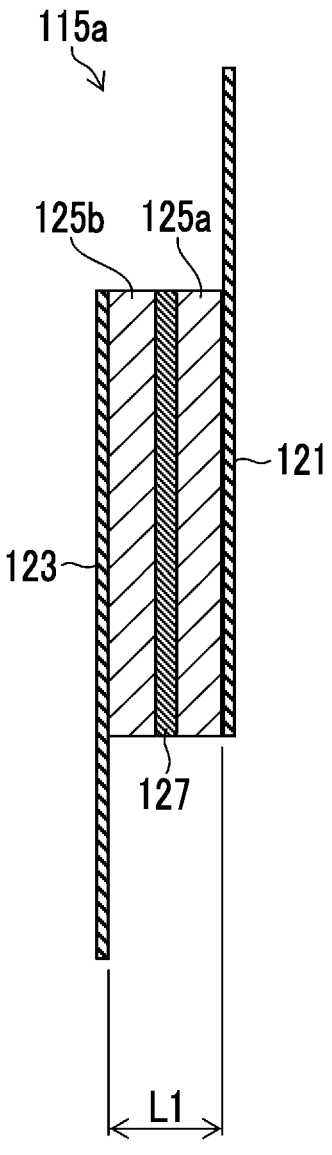
FIG. 9 is a view for explaining Embodiment 1 of an overlapping region.

FIG. 9 is a view for explaining Embodiment 1 of the overlapping region.

In Embodiment 1, in order to reduce the noise, a gap of a certain value or more is secured such that FPC pattern substrates are not close to each other.

The overlapping region 115a of Embodiment 1 is composed of an FPC pattern substrate 121, an FPC pattern substrate 123, an FPC backing surface 125a (resin member), an FPC backing surface 125b (resin member), and a double-sided tape 127. On the back surfaces of the FPC pattern substrates 121 and 123, FPC backing surfaces 125a and 125b are provided in order to have rigidity and the like. The FPC backing surfaces 125a and 125b are composed of the same material as the FPC pattern substrate. For example, the FPC backing surfaces 125a and 125b are made of polyimide. In Embodiment 1, the FPC backing surface 125a and the FPC backing surface 125b are disposed so as to face each other, and the FPC backing surface 125a and the FPC backing surface 125b are adhered to each other with the double-sided tape 127. Accordingly, a gap L1 can be maintained between the FPC pattern substrate 121 and the FPC pattern substrate 123, and thus the noise can be reduced.

Figure 10:
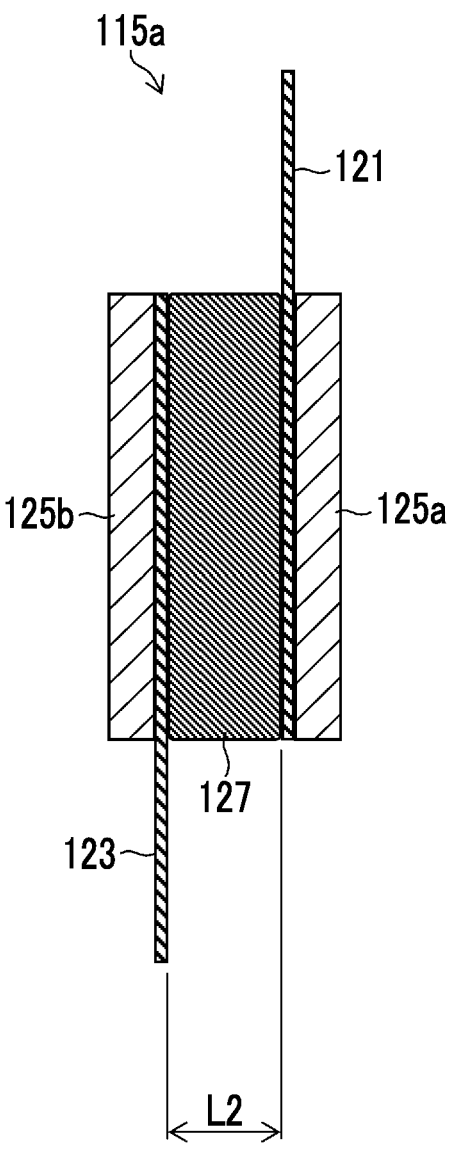
FIG. 10 is a view for explaining Embodiment 2 of the overlapping region.

FIG. 10 is a view for explaining Embodiment 2 of the overlapping region.

Also in Embodiment 2, in order to reduce the noise, a gap of a certain value or more is secured such that FPC pattern substrates are not close to each other.

In the overlapping region 115a of Embodiment 2, the double-sided tape 127 (resin member) is disposed between the FPC pattern substrate 121 and the FPC pattern substrate 123. Here, it is preferable that the double-sided tape 127 has a large thickness, and for example, the double-sided tape 127 having a thickness of 0.5 mm is used. As described above, a gap L2 between the FPC pattern substrate 121 and the FPC pattern substrate 123 can be secured by disposing the thick double-sided tape 127 between the FPC pattern substrate 121 and the FPC pattern substrate 123. Accordingly, the noise in the overlapping region 115a can be reduced.

Figures 11, 12:
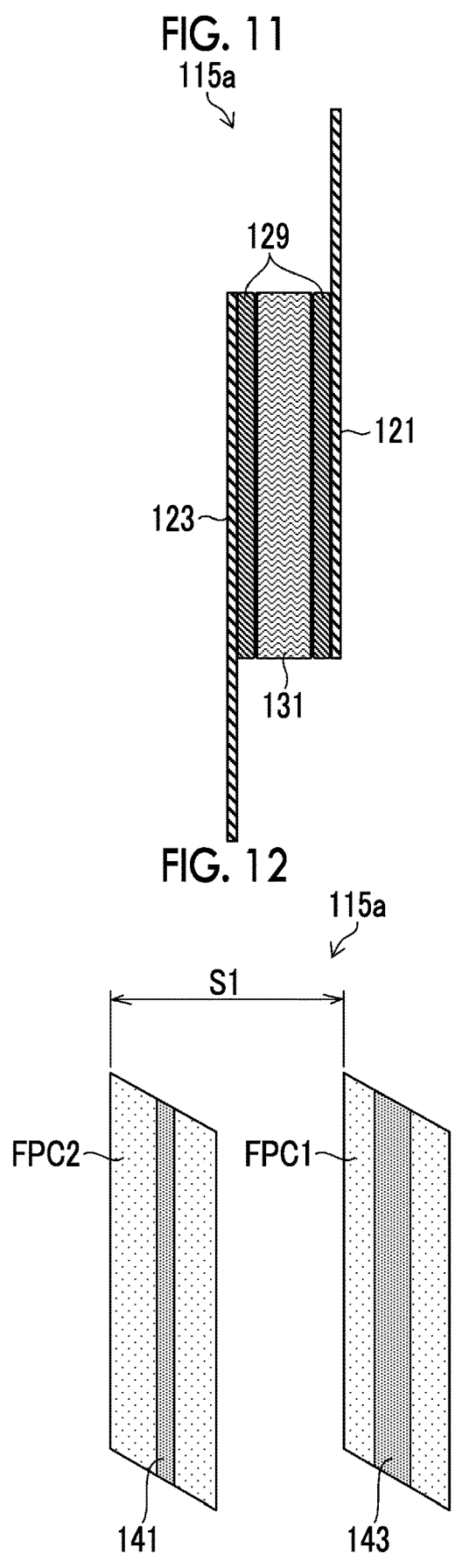

FIG. 11 is a view for explaining Embodiment 3 of the overlapping region.

In the overlapping region 115a of Embodiment 3, a sheet metal 131 (metal member) is disposed between the FPC pattern substrate 121 and the FPC pattern substrate 123. The sheet metal 131 has a function of an electromagnetic noise suppression member. By disposing double-sided tapes 129 on both surfaces of the sheet metal 131, the sheet metal 131 and the FPC pattern substrate 121 are bonded, and the sheet metal 131 and the FPC pattern substrate 123 are bonded. By disposing the sheet metal 131 between the FPC pattern substrate 121 and the FPC pattern substrate 123, the electromagnetic noise can be shielded and the noise can be reduced. In this case, the gap between the FPC pattern substrate 121 and the FPC pattern substrate 123 can be minimized, and the size of the elliptical FPC unit can be suppressed.

Next, a reduction of noise superposition in the overlapping region will be described.

In the overlapping region 115a of the elliptical FPC unit 105a, since the FPCs are overlapped, the noise will be superposed in a case where a digital power supply line or a signal line, which is a noise source, and an analog power supply line having high noise sensitivity run in parallel. Hereinafter, an embodiment of the overlapping region 115a in which the superposition of the noise can be reduced will be described.

FIG. 12 is a view for explaining Embodiment 4 of the overlapping region.

The overlapping region 115a of Embodiment 4 provides a certain distance between the FPC1 and the FPC2. By providing a certain distance between the FPC1 and the FPC2, the superposition of the noise can be reduced.

The FPC1 has a noise source line 143, and the FPC2 has an analog power supply line 141 (noise-receiving line having high noise sensitivity) that is influenced by the noise. Since the configurations of the FPC1 and the FPC2 are the same in FIGS. 13 and 14 described below, the description of the configurations of the FPC1 and the FPC2 will not be repeated below. Then, in a case where the noise source line 143 and the analog power supply line 141 run in parallel, by configuring the overlapping region 115a such that a distance S1 is maintained, it is possible to reduce superposition of the noise on the analog power supply line 141.

Figure 13:
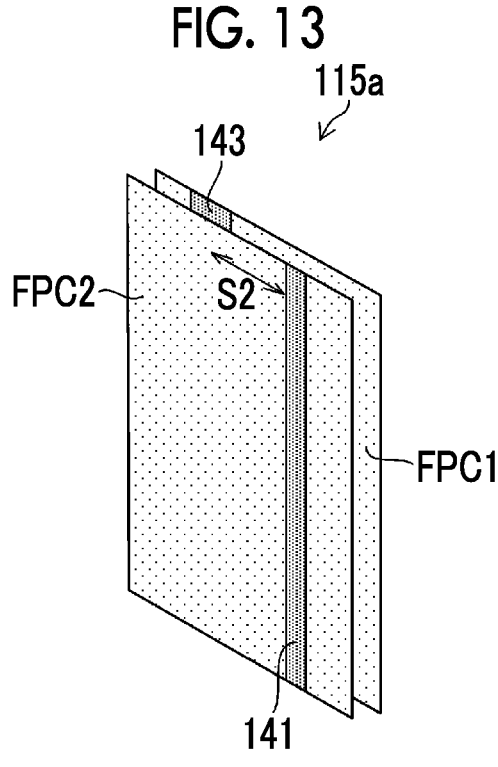
FIG. 13 is a view for explaining Embodiment 5 of the overlapping region.

FIG. 13 is a view for explaining Embodiment 5 of the overlapping region.

In the overlapping region 115a of Embodiment 5, the disposition of the lines of the FPCs is designed so as to avoid parallel running with the noise source line 143. For example, in a case where the noise source line 143 is disposed at an end of the FPC1, the analog power supply line 141 is disposed at an opposite end of the FPC2. Accordingly, even in a case where a gap between the FPC1 and the FPC2 is narrowed, a gap S2 between the noise source line 143 and the analog power supply line 141 can be secured, and it is possible to reduce the superposition of the noise on the analog power supply line 141.

Figure 14:
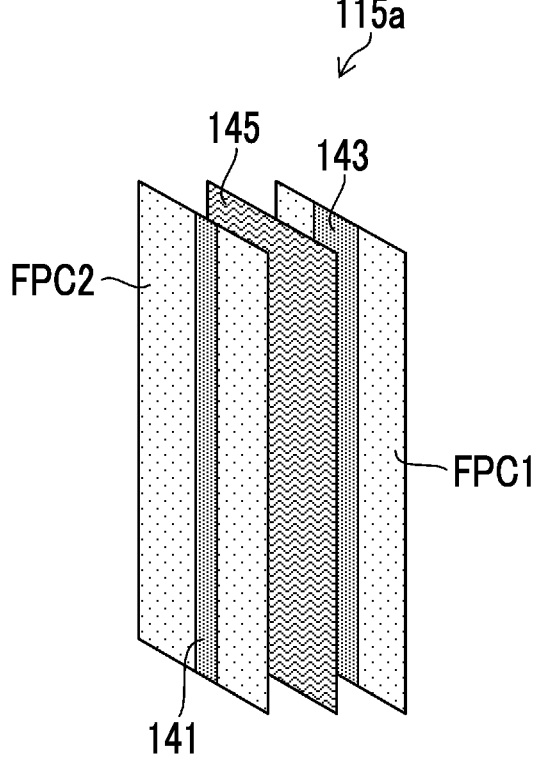
FIG. 14 is a view for explaining Embodiment 6 of the overlapping region.

FIG. 14 is a view for explaining Embodiment 6 of the overlapping region.

In the overlapping region 115a of Embodiment 6, a metal layer (solid ground) 145 is disposed between the FPC1 and the FPC2. The metal layer 145 functions as an electromagnetic noise suppression member. By providing the metal layer 145 in this way, it is possible to reduce the superposition of the noise of the noise source line 143 of the FPC1 on the analog power supply line 141 of the FPC2.

Next, a reduction of a deviation in impedance in the overlapping region will be described.

In the overlapping region 115a of the elliptical FPC unit 105a, since the FPCs are overlapped, another metal wire may come close to a signal line for high-speed communication which is impedance-matched. In such a case, the impedance may deviate and a propagation signal may be deteriorated. Therefore, it is necessary to reduce the deviation in impedance in the overlapping region 115a.

Figures 15, 16:
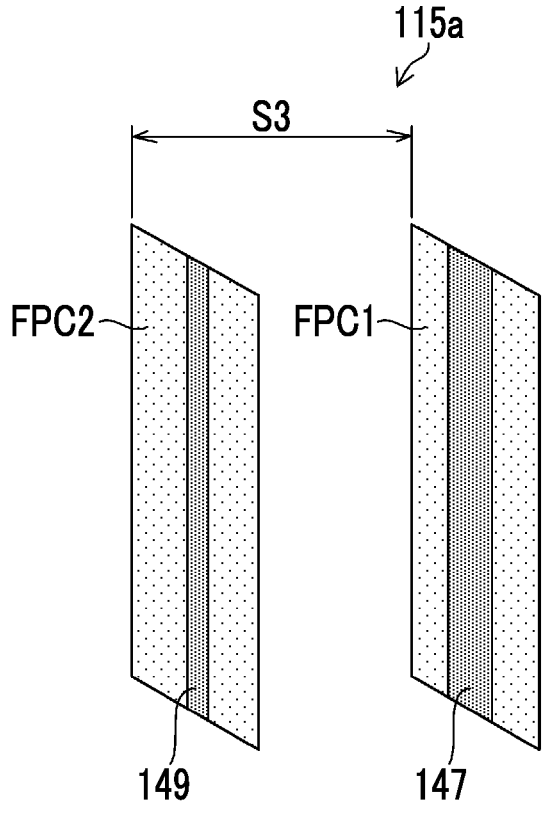
FIG. 15 is a view for explaining Embodiment 7 of the overlapping region.
FIG. 16 is a schematic view showing a specific example of an FPC.

FIG. 15 is a view for explaining Embodiment 7 of the overlapping region.

In the overlapping region 115a of Embodiment 7, a distance S3 is provided between the FPC1 having a metal wire 147 and the FPC2 having an impedance matching signal line 149. In this way, by providing the distance S3 between the FPC1 and the FPC2 in the overlapping region 115a, it is possible to reduce a deviation in impedance of the impedance matching signal line 149. For example, the distance S3 is preferably 0.3 mm or more.

Specific Example of Shape of FPC

Next, specific examples of a shape of the FPC used in the shake correction device 100 will be described. Each of the FPCs described below has a bent portion 113. The elliptical FPC unit described above is formed by these bent portions 113. The shape of the FPC according to the embodiment of the present invention is not limited to the specific examples described below.

FIGS. 16 to 19 are schematic views showing specific examples of the FPC.

The FPC shown in FIG. 16 is, for example, an FPC that is used to transmit and receive signals and/or to supply electricity for driving the imaging element 16. The FPC shown in FIG. 16 has two bent portions 113. These two bent portions 113 configure a part of the elliptical FPC unit.

Figure 17:
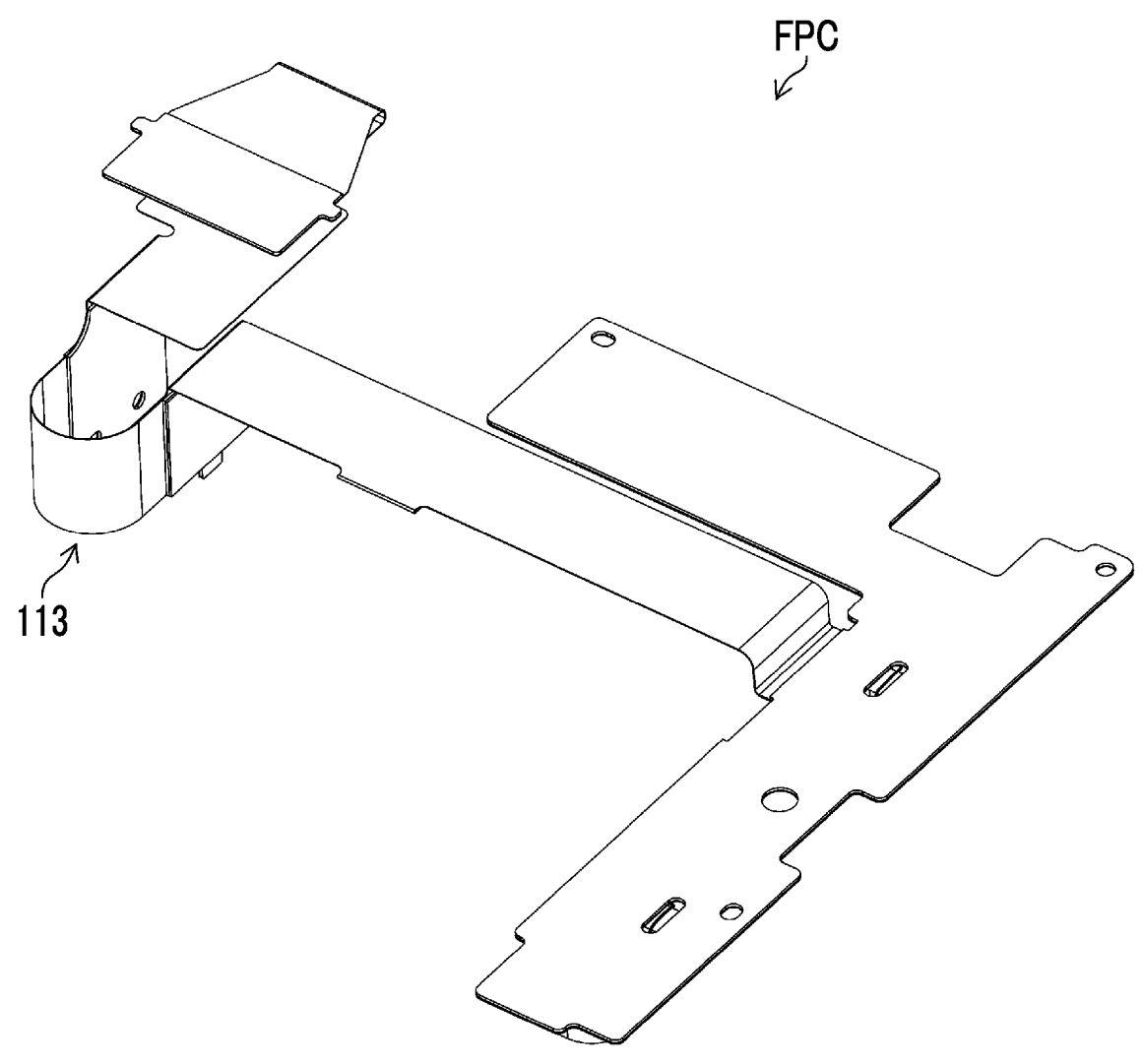
FIG. 17 is a schematic view showing a specific example of the FPC.

The FPC shown in FIG. 17 is, for example, an FPC that transmits and receives signals and/or supplies electricity for driving the voice coil motors 103*a* to 103C. The FPC shown in FIG. 17 has one bent portion 113. The bent portion 113 configures a part of the elliptical FPC unit.

Figure 18:
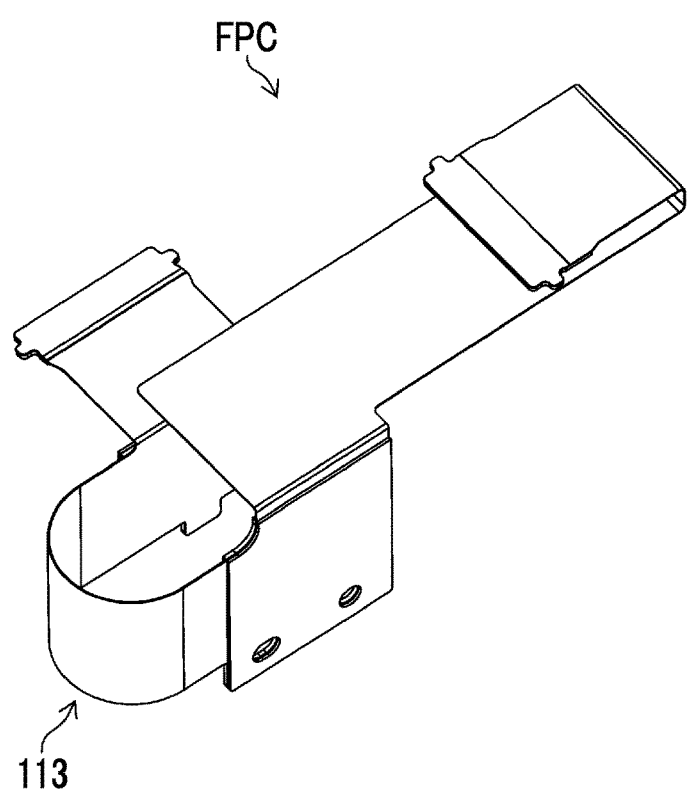
FIG. 18 is a schematic view showing a specific example of the FPC.

The FPC shown in FIG. 18 is, for example, an FPC that is used to transmit and receive data between the imaging element 16 and a main board. The FPC shown in FIG. 18 has one bent portion 113. The bent portion 113 configures a part of the elliptical FPC unit.

Figure 19:
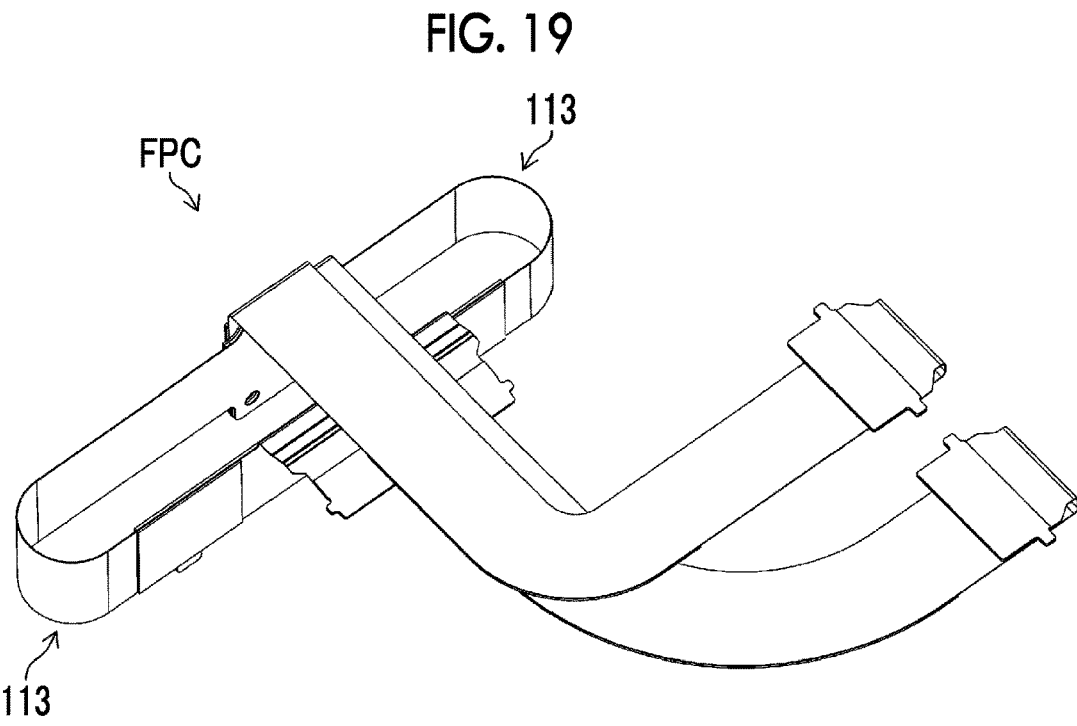
FIG. 19 is a schematic view showing a specific example of the FPC.

The FPC shown in FIG. 19 is formed to have two bent portions 113 by routing one FPC. Therefore, in the FPC shown in FIG. 19, the elliptical FPC unit can be formed by one FPC.

Appendix

The present disclosure described above includes the inventions of the following aspects.
Aspect 1
A shake correction device that performs shake correction of an imaging element, comprising: a movable unit that includes the imaging element and a coil of an actuator and is configured to move within a plane intersecting an optical axis; a fixed unit including a magnet and a yoke of the actuator; and a flexible circuit that is connected to the imaging element and/or the coil, in which the flexible circuit has a first bent portion and a second bent portion that are bent, and is disposed to form a first unit by making opening portions of the first bent portion and the second bent portion face each other and fixing the first bent portion and the second bent portion in regions overlapping with each other.
Aspect 2
The shake correction device according to Aspect 1, in which the first unit has two overlapping regions, the opening portion of the first bent portion is located outside in one overlapping region, and the opening portion of the second bent portion is located outside in the other overlapping region.
Aspect 3
The shake correction device according to Aspect 1 or 2, in which the first bent portion and the second bent portion overlap with each other by a length equal to or larger than a width of the first bent portion or a width of the second bent portion in the overlapping region.
Aspect 4
The shake correction device according to any one of Aspects 1 to 3, in which the first bent portion and the second bent portion are fixed with a gap in the overlapping region.
Aspect 5
The shake correction device according to any one of Aspects 1 to 3, in which the first bent portion and the second bent portion are fixed by disposing a metal member between the first bent portion and the second bent portion in the overlapping region.

Aspect 6
The shake correction device according to any one of Aspects 1 to 3, in which the first bent portion and the second bent portion are fixed by disposing a resin member between the first bent portion and the second bent portion in the overlapping region.
Aspect 7
The shake correction device according to any one of Aspects 1 to 3, in which the first bent portion and the second bent portion are fixed by disposing an electromagnetic noise suppression member between the first bent portion and the second bent portion in the overlapping region.
Aspect 8
The shake correction device according to any one of Aspects 1 to 7, in which the first bent portion and the second bent portion are disposed such that a noise source line of the first bent portion and a noise-receiving line having high noise sensitivity of the second bent portion are separated from each other in the overlapping region.
Aspect 9
The shake correction device according to any one of Aspects 1 to 7, in which the first bent portion and the second bent portion are disposed such that a digital power supply line of the first bent portion and an analog power supply line of the second bent portion are separated from each other in the overlapping region.
Aspect 10
The shake correction device according to any one of Aspects 1 to 9, in which the first bent portion and the second bent portion are disposed such that a metal wire of the first bent portion and an impedance matching signal line for high-speed communication of the second bent portion are separated from each other in the overlapping region.
Aspect 11
The shake correction device according to any one of Aspects 1 to 10, in which the first unit is disposed on a surface of the movable unit intersecting an imaging surface of the imaging element.
Aspect 12
The shake correction device according to any one of Aspects 1 to 11, in which the flexible circuit has a third bent portion and a fourth bent portion that are bent, and is disposed to form a second unit by making opening portions of the third bent portion and the fourth bent portion face each other and fixing the third bent portion and the fourth bent portion in regions overlapping with each other.
Aspect 13
The shake correction device according to Aspect 12, in which the first unit and the second unit are disposed on a surface of the movable unit intersecting an imaging surface of the imaging element, and are disposed at positions where rotational moments cancel each other out with respect to a centroid of the movable unit.

Although examples of the present invention have been described above, it goes without saying that the present invention is not limited to the above-described embodiment and various modifications can be made without departing from the scope of the present invention.

EXPLANATION OF REFERENCES

1: subject
2: imaging apparatus main body
10: imaging apparatus
16: imaging element
101*a*: side surface
40: controller
100: shake correction device 101: movable unit
103a: voice coil motor
103b: voice coil motor
103c: voice coil motor
105a: elliptical FPC unit
105b: elliptical FPC unit
109a: magnet
109b: magnet
109c: magnet
111: fixed unit
113a: first bent portion
113b: second bent portion
115a: overlapping region
115b: overlapping region
119: base plate
121: FPC pattern substrate
123: FPC pattern substrate

What is claimed is:

1. A shake correction device that performs shake correction of an imaging element, comprising:
   a movable unit that includes the imaging element and a coil of an actuator and is configured to move within a plane intersecting an optical axis;
   a fixed unit including a magnet and a yoke of the actuator; and
   a flexible circuit that is connected to the imaging element and/or the coil,
   wherein the flexible circuit has a first bent portion and a second bent portion that are bent, and is disposed to form a first unit by making opening portions of the first bent portion and the second bent portion face each other and fixing the first bent portion and the second bent portion in regions overlapping with each other.

2. The shake correction device according to claim 1,
   wherein the first unit has two overlapping regions, the opening portion of the first bent portion is located outside in one overlapping region, and the opening portion of the second bent portion is located outside in the other overlapping region.

3. The shake correction device according to claim 1,
   wherein the first bent portion and the second bent portion overlap with each other by a length equal to or larger than a width of the first bent portion or a width of the second bent portion in the overlapping region.

4. The shake correction device according to claim 1,
   wherein the first bent portion and the second bent portion are fixed with a gap in the overlapping region.

5. The shake correction device according to claim 1,
   wherein the first bent portion and the second bent portion are fixed by disposing a metal member between the first bent portion and the second bent portion in the overlapping region.

6. The shake correction device according to claim 1,
   wherein the first bent portion and the second bent portion are fixed by disposing a resin member between the first bent portion and the second bent portion in the overlapping region.

7. The shake correction device according to claim 1,
   wherein the first bent portion and the second bent portion are fixed by disposing an electromagnetic noise suppression member between the first bent portion and the second bent portion in the overlapping region.

8. The shake correction device according to claim 1,
   wherein the first bent portion and the second bent portion are disposed such that a noise source line of the first bent portion and a noise-receiving line having high noise sensitivity of the second bent portion are separated from each other in the overlapping region.

9. The shake correction device according to claim 1,
   wherein the first bent portion and the second bent portion are disposed such that a digital power supply line of the first bent portion and an analog power supply line of the second bent portion are separated from each other in the overlapping region.

10. The shake correction device according to claim 1,
   wherein the first bent portion and the second bent portion are disposed such that a metal wire of the first bent portion and an impedance matching signal line for high-speed communication of the second bent portion are separated from each other in the overlapping region.

11. The shake correction device according to claim 1,
   wherein the first unit is disposed on a surface of the movable unit intersecting an imaging surface of the imaging element.

12. The shake correction device according to claim 1,
   wherein the flexible circuit has a third bent portion and a fourth bent portion that are bent, and is disposed to form a second unit by making opening portions of the third bent portion and the fourth bent portion face each other and fixing the third bent portion and the fourth bent portion in regions overlapping with each other.

13. The shake correction device according to claim 12,
   wherein the first unit and the second unit are disposed on a surface of the movable unit intersecting an imaging surface of the imaging element, and are disposed at positions where rotational moments cancel each other out with respect to a centroid of the movable unit.

14. An imaging apparatus comprising:
   the shake correction device according to claim 1.

* * * * *